July 18, 1933.  J. LEDWINKA  1,918,410
VEHICLE BODY FRONT CONSTRUCTION
Filed Jan. 17, 1930  4 Sheets-Sheet 1
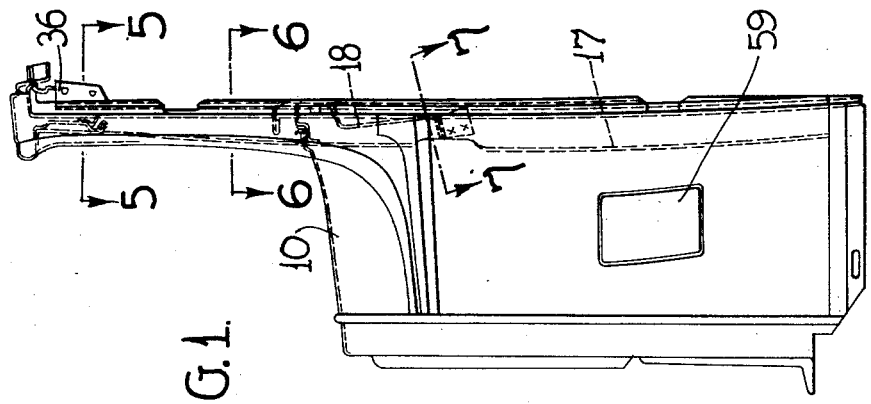
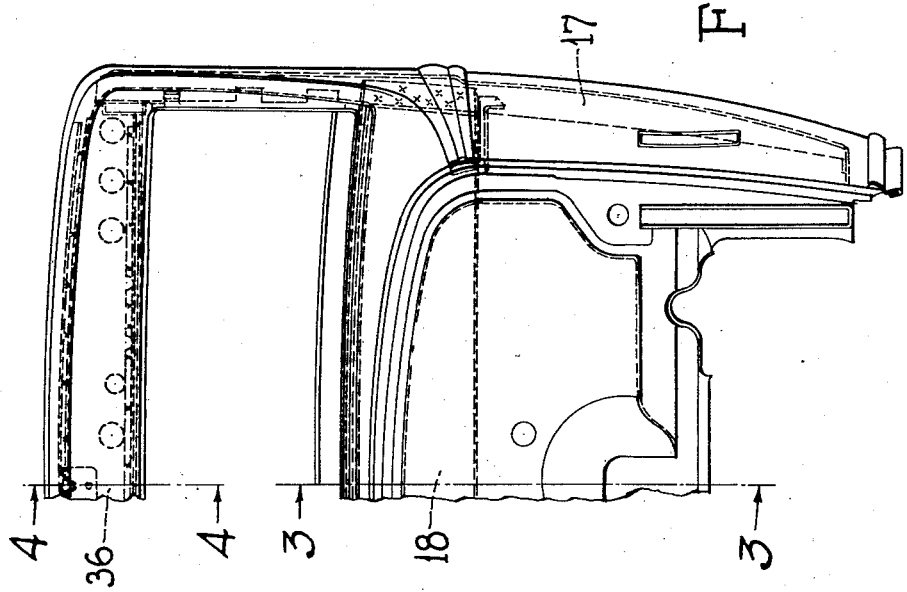
INVENTOR.
JOSEPH LEDWINKA.
BY
*John P. Darbox*
ATTORNEY.

July 18, 1933. J. LEDWINKA 1,918,410

VEHICLE BODY FRONT CONSTRUCTION

Filed Jan. 17, 1930    4 Sheets-Sheet 2

INVENTOR.
JOSEPH LEDWINKA
BY
ATTORNEY.

July 18, 1933.  J. LEDWINKA  1,918,410
VEHICLE BODY FRONT CONSTRUCTION
Filed Jan. 17, 1930   4 Sheets-Sheet 3

INVENTOR.
JOSEPH LEDWINKA.
BY John P. Tarbox
ATTORNEY.

July 18, 1933. J. LEDWINKA 1,918,410
VEHICLE BODY FRONT CONSTRUCTION
Filed Jan. 17, 1930 4 Sheets-Sheet 4

INVENTOR.
JOSEPH LEDWINKA
BY
John P. Barbox
ATTORNEY.

Patented July 18, 1933

1,918,410

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY FRONT CONSTRUCTION

Application filed January 17, 1930. Serial No. 421,358.

The invention relates to vehicle body front constructions and more particularly to the construction of such body fronts around the windshield opening, and the rear edge of the cowl.

It is an object of my invention to provide a cowl and windshield frame construction particularly adapted to a vertically slidable windshield which is simple in construction, easy of formation of the several parts entering into the construction, easy of assembly, light in weight and at the same time very strong and durable.

To the attainment of this object I form the outer paneling around the windshield opening in a unitary stamping, and associate with this unitary stamping auxiliary header and post stampings to reinforce the same strongly. My invention also contemplates combining the functions of a number of elements in a single unitary stamping, such for example, as the lower windshield header, instrument board and parts of the ventilating system, and by the particular manner in which the various reinforcing members are interconnected thereby providing great strength and easy access for securing the parts together by spot welding.

Other and further objects and advantages are attained by my novel improved construction, all of which will become apparent from the following detailed description when read in connection with the accompanying drawings, in which Fig. 1 shows in side elevation a front body unit embodying the invention.

Fig. 2 shows said unit in a partial front elevation.

Figure 5:
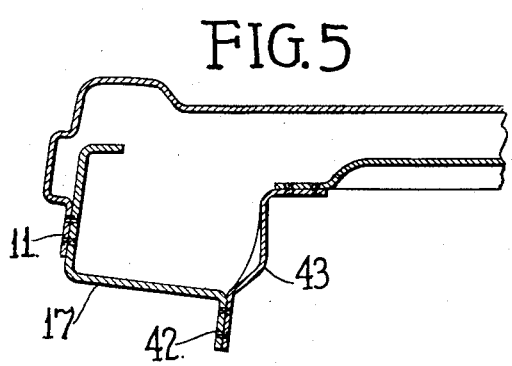
Figs. 3, 4, 5, 6 and 7 are detail sectional views taken respectively on the correspondingly numbered section lines of Figs. 1 and 2.

According to my invention the outer cowl paneling designated by numeral 10 extends entirely around the windshield opening and is formed at the bottom of the windshield opening with a curved transversely extending rear flanged edge 12 forming with the body of the panel an angular seat. At the sides and top of the windshield opening it is formed with inwardly extending flanges 13 having reversely bent edge flanges adjacent the plane of the windshield, the paneling thus serving to form the moulding around the outer side of the windshield opening.

In its upper portion it is extended forwardly at 14 to form a blunt visor and then is bent upwardly and back to form a forward portion of the roof at 15. The rear edge of this portion is rabbeted at 16 by a double rabbet to receive the front edge of a roof panel. This rabbeted edge is located some distance rearwardly of the flange 13 of the outer panel and forms with said flange and the roof portion 15 a generally downwardly presenting channel providing a space within which the windshield may be raised.

At the sides the cowl panel 10 is reinforced at its rear edges by the inwardly facing generally channel section posts 17 which extend from the bottom of the cowl to the top of windshield opening. The form of these posts is such as to adapt them in particular for the secure connection of the cross headers and other associated parts to form strong attaching means therebetween and so that they can be readily attached by spot welding. The rear edges of the cowl paneling 10 are beaded at 10' and have their offset edges 11' welded to the outside faces of the posts through substantially the length of the posts to securely unite them to the cowl paneling, see Figs. 5, 6 and 7.

Figure 3:
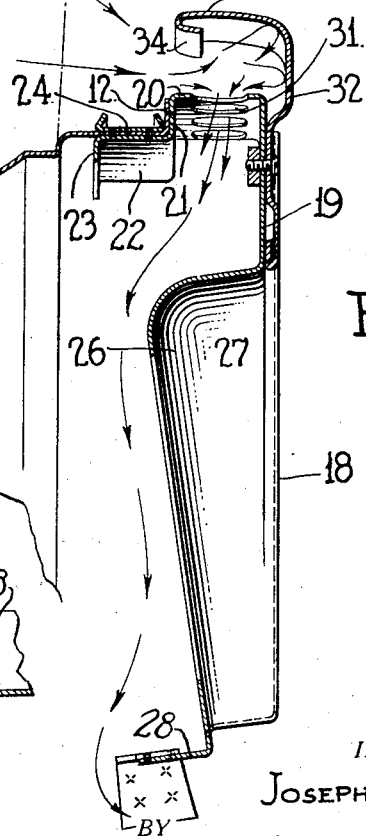

At the bottom of the windshield opening the rear edge of the cowl panel is reinforced by a transversely extending stamping 18, the upper portion of which is of generally downwardly presenting channel form, having a deep rear wall 19, a bottom 20 and a shallow front wall 21. The front wall is provided with a forwardly extending flange 22 reinforced by a downwardly extending edge flange 23. The angular rear edge formed by the body 10, and rear edge flange 12 of the cowl panel is seated in the angle formed by the forward wall 21 and the flange 22 of stamping 18 and is secured thereto by spot welding, as shown in Fig. 3. The weather strip retainer channel 24 is seated in the angle formed by the flange 12 of the panel and spot welded thereto.

Figure 7:
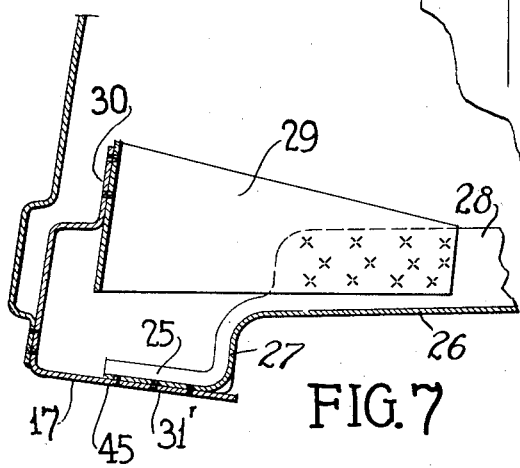
Figure 8:
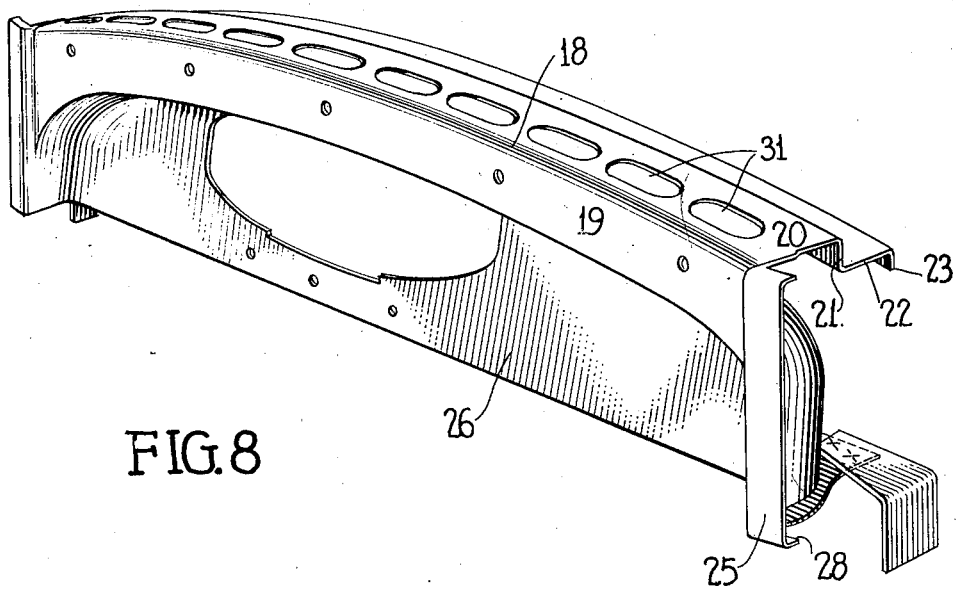
Fig. 8 is a perspective view of a combined lower header, instrument board and ventilation deflector, according to the invention.
Figure 9:
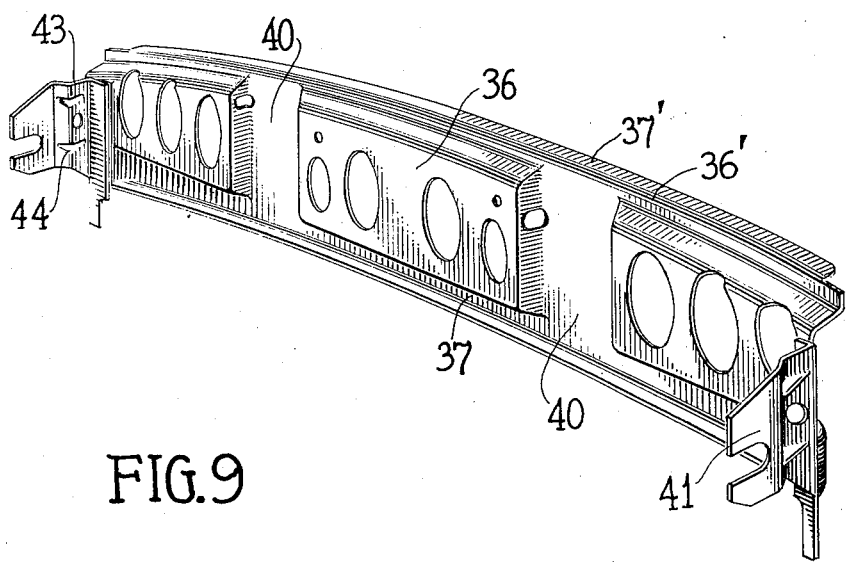
Fig. 9 is a similar view of the top header rail stamping and associated parts.
Figure 10:
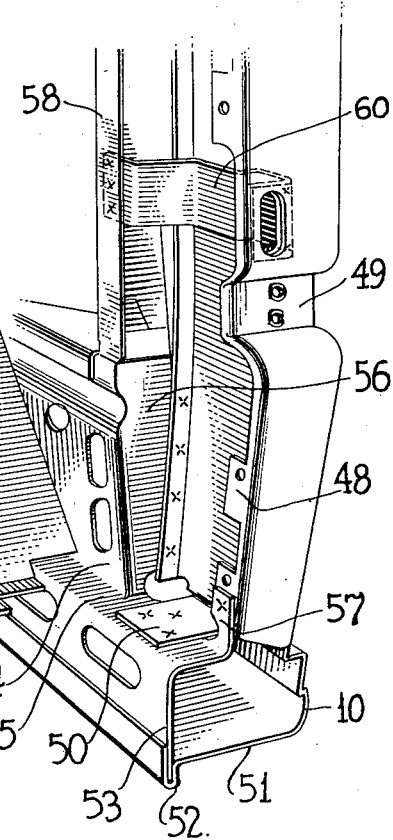
Fig. 10 is a perspective view of the rear lower corner of the cowl, looking at it from the inside.

At the sides the rear wall of the channel section top part of the header stamping 18 is slightly offset rearwardly and extended downwardly to form wide attaching flanges 25, Fig. 8, through which the header stamping is welded to the posts 17, as shown in Fig. 7. Below the flange 19 and inwardly of the attaching flanges 25, the stamping is extended forwardly and downwardly to form the rearwardly inclined instrument board portion 26, this inclined portion connecting with the portion 19 and flanges 25 by curved portions 27. At its lower edge the combined instrument board and header stamping 18 is flanged forwardly at 28 to further reinforce the same, and this forwardly extending flange is secured to the post 17, as shown in Fig. 7, through the angle bracket 29, having one arm welded to the flange 28 and the other to a wall 30 of the post extending substantially right angularly to the wall 31' of the post to which the flange 25 is connected.

Because of its shape, the combined header and windshield stamping 18 is inherently very strong and rigid, and through its secure connections just described to the front posts 17 and to the cowl panel 10, it very strongly interbraces these parts.

Figure 4:
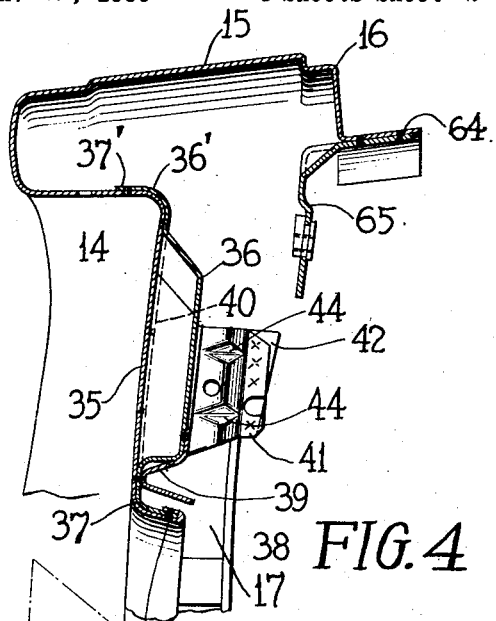

According to my invention, I make use of this stamping in the ventilating of the interior of the car, for by providing spaced ventilator openings 31 in the upper exposed portion of the stamping and attaching a deflector panel 32, extending above the header and having its upper portion curved forwardly at 33 and bent back at 34 to provide a smooth and reinforced edge, to the rear wall 19, the air is deflected, when the windshield is slightly raised, as indicated by the arrows, Fig. 4, downwardly through the openings 31 and forwardly over the instrument board portion 26 toward the bottom of the body.

The novel improved stamping 18, thus performs a triple function, as part of the ventilator system, as header connecting the posts and cowl panel and as an instrument board.

At the top the outer panel has a vertically extending portion 35 of considerable extent before it merges into the forwardly extending visor portion 14. This portion forms with the visor portion 14 and flange 13, a substantially Z-section portion. This is reinforced and connected to the posts 17 by a header rail stamping 36 of novel construction.

The header rail has its body portion offset inwardly from the panel and is provided with cut-out portions for lightening purposes. At the bottom it is of channel form in cross-section as indicated by reference numeral 37 and the lower side and bottom of this channel section portion nests with the angle formed by the portion 35 and flange 13 of the outer panel and is firmly secured thereto by spot welding and by clinching over the edge of the flange 13 as shown at 38, Fig. 3. The channel also provides a seat within which may be secured the angular metal strip 39, forming the weather strip securing means. This strip is shown secured to the rail 37 by spot welding it thereto, and having the major portion thereof seated in the channel 37. The upper edge of the rail 36 is rounded at 36' and forwardly flanged at 37' to fit over the rounded portion joining the parts 14 and 35 and is secured thereto by spot welding, as shown. Additional strength and stiffness is secured by the offset portions 40, which seat against the outer panel portion 35 and are secured thereto by spot welding. These offsets also provide spaces for mounting the windshield wipers. The upper ends of the posts 17 are secured to the header rail 36 by angle brackets 41 secured through one arm by spot welding to a flange 42 of the posts and through another arm to the rail, see Fig. 5. The body of the angle brackets extending between the parts which it connects may be reinforced, as shown, by bending it into obtuse angle form at 43 and indenting the metal through the obtuse angled portion, as indicated at 44.

Figure 11:
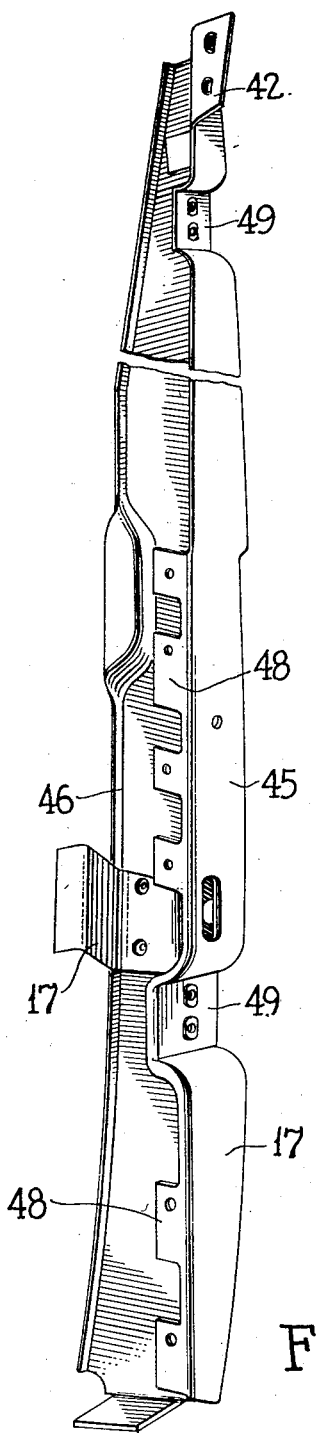
Fig. 11 is a perspective view of the front post stamping, looking at it from the inside.

As previously stated, the posts 17 are of generally channel form, presenting inwardly, having the rear relatively deep side wall 45, see Fig. 11, and the forward shallow side wall 46. At the top the rear wall is formed with a rearwardly projecting flange 42 to which the bracket 41 connecting the header rail stamping 36 is welded.

In its lower portion the post stamping rear side wall is provided with forwardly extending tabs 48 against which the upholstery may be secured. Adjacent its upper and lower portions the rear wall of the post is provided with offset portions 49 to receive the hinge straps.

At the bottom the post is formed with an inwardly extending tab 50, which forms a part of the joint between the post and the lower rear portion of the cowl paneling.

At the bottom the outer cowl panel 10 is extended inwardly at 51 and downwardly at 52 and crimped over the lower edge 53 of an inner reinforcing panel stamping 54. The inner panel stamping 54 is formed with a ledge 55 on which the flooring may rest and with an outwardly extending flange 56 which overlaps and is welded to the forward side wall 46 of the post stamping. The tab 50 at the lower end of the post laps over the ledge 55 and is secured thereto by spot welding. Further securement of the post and paneling is by an upwardly extending tab 57 at the rear edges of the inner panel 54 which is welded to the lower forwardly extending tab 48 of the post. It will thus be seen that a very secure and rigid joinder readily accessible for spot welding is provided at the bottom of the posts 17 between them and the inner and outer cowl panels 10 and 54.

A frame 58 for the ventilator opening 59 in the side of the cowl further reinforces the cowl and the rear edge member of this frame is braced to the post 17 by a sheet metal bracket 60, spot welded at one end to the frame 58 and at the other end to the post.

At the sides of the windshield opening the outer panel 10 is turned in at 13 and formed with an angular edge portion 62 facing rearwardly and inwardly and adapted to receive the edge of the sliding windshield panel.

Figure 6:
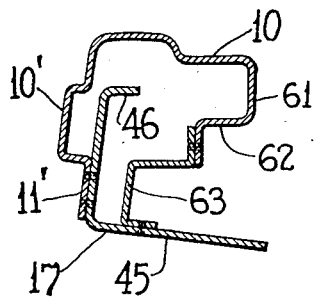

This angular edge portion is braced to the rear wall of the post by angular brackets as 63 spot welded as shown in Fig. 6, to the edge of the panel and to the post, and bridging the space between them.

The rearwardly extending edge flange 64 of the roof portion 15 of the outer paneling 10 is shown provided with angle brackets 65 rigidly secured thereto by spot welding, to which the transversely extending windshield regulator and finish panel may be secured in spaced reation to the body of the cross header rail stamping 36 to permit the windshield to be raised therebetween.

While I have herein described a specific embodiment of the invention, it will be understood that changes and modifications can be made without departing from the substance and spirit of the appended claims.

What I claim is:

1. In a vehicle front construction, a unitary pressed metal stamping extending from side to side of the body to form a lower windshield header and formed with a generally downwardly presenting upper portion formed with a seat along its front edge to receive the rear edge of a cowl panel, and extended downwardly through its rear wall to form an instrument board, the upper portion of said stamping in rear of the cowl panel seat being formed with ventilator openings.

2. In a vehicle front construction, a unitary pressed metal stamping extending from side to side of the body and of generally downwardly presenting channel form at the top and provided with an angular seat for the edge of the cowl panel and for receiving the edge of a windshield panel, said stamping being formed with ventilator openings in its upper wall, and means for deflecting a current of air through said openings.

3. In a vehicle front construction, sheet metal front posts of generally inwardly presenting channel section, and a unitary instrument board and windshield header stamping extending between said posts and rigidly connected thereto through vertically deep flanges along the edges of said stamping and the rear side walls of the posts, said stamping being forwardly flanged at its lower edge, and additionally connected to another wall of said posts through said flange.

4. A vehicle front construction comprising an outer panel stamping arched over to form a hollow section presenting generally downwardly, and having its front wall extended inwardly substantially to the plane of the windshield opening at the top of said opening, a reinforcing stamping connected to the edge of said panel and to a point spaced from the edge, and an attaching flange member secured to the other edge of the panel in spaced relation to the reinforcing member to permit the movement of a windshield panel therebetween.

5. A top windshield header comprising an outer panel portion extending substantially vertically, an inner reinforcing header rail having its main body spaced from said panel but secured thereto along its upper and lower edges, front posts, and means whereby the ends of said rail are secured to the front posts.

6. A top windshield header rail comprising a unitary stamping formed along its lower edge with a rearwardly facing channel section portion for receiving means for securing the weather stripping.

7. A top windshield header rail comprising a unitary stamping flanged at the top to nest with an outer panel and formed with a rearwardly presenting channel section portion at its lower edge, and a weather strip securing strip secured in said channel.

8. A top windshield header rail having its main body offset rearwardly from its upper and lower edges, and portions of said main body intermediate its upper and lower edges offset forwardly to substantially the plane of its upper and lower edge portions, the sides of said stamping being extended rearwardly to provide attaching means whereby the rail may be secured to front posts.

9. A cowl construction comprising outer and inner panels joined together in their lower edges but spaced apart in their bodies to form a hollow structure, a front post of generally inwardly presenting channel form, the rear edge of the outer panel being secured to the bottom wall of the channel of the post, said bottom wall being formed at its lower edge with a tab secured to the inner panel, the inner panel being further secured to the front and rear side walls of the post.

10. A cowl construction comprising a generally inwardly facing channel section post member, and a panel member applied to the forward and outside of said post, and having one edge thereof rabbeted to receive the edge of a door and directly secured to the bottom wall of the post, and the other edge rabbeted to receive the edge of a windshield and secured to the rear wall of the post through a bracket.

JOSEPH LEDWINKA.